United States Patent [19]

Hollander

[11] 4,253,690
[45] Mar. 3, 1981

[54] SAFETY KNOB

[76] Inventor: Nathan Hollander, 6030 N. Washtenaw, Chicago, Ill. 60659

[21] Appl. No.: 969,199

[22] Filed: Dec. 13, 1978

[51] Int. Cl.³ ............................................. E05C 21/00
[52] U.S. Cl. ................................................... 292/354
[58] Field of Search ............... 292/347, 354, 336.3, 292/DIG. 2, DIG. 27, 353

[56] References Cited
U.S. PATENT DOCUMENTS

| | | | |
|---|---|---|---|
| 401,003 | 4/1889 | Burns | 292/DIG. 27 |
| 711,838 | 10/1902 | Fader | 292/354 |
| 962,448 | 6/1910 | Miller | 292/DIG. 27 |
| 1,516,152 | 11/1924 | Dumont | 292/DIG. 27 |
| 3,428,351 | 2/1969 | Volk | 292/347 |

Primary Examiner—Richard E. Moore
Attorney, Agent, or Firm—Alter and Weiss

[57] ABSTRACT

A safety knob for preventing unauthorized persons, such as small children, from operating the knobs in a given direction; but enabling even the unauthorized persons to operate the knob in the opposite direction.

12 Claims, 3 Drawing Figures

SAFETY KNOB

This invention is concerned with knobs for controlling valves; and more particularly, with safety knobs used for preventing unauthorized persons from operating the knobs.

It has long been recognized that valve handles or knobs should be designed to prevent unauthorized persons, such a young children, from operating the knobs, while enabling adults to use the knobs without restriction.

One of the major areas where difficulties are encountered is with knobs for operating hot water faucets, for example. With the ordinary knobs, young children can easily, inadvertantly turn the hot water faucet on and scald themselves severely. Also, for example, young children have been known to turn the gas on gas stoves and heaters, leading either to explosions or suffocation.

To prevent such traumatic inadvertancies, various knobs and knob attachments have been provided. For example, U.S. Pat. No. 3,428,351 (Vault) teaches a door knob safety device which requires manipulation of a spring with a force that can normally only be applied by an adult before the door knob can be operated in any direction.

The prior art safety devices of this kind have some serious shortcomings. They are either unduly complicated; or they are simple enough to really be manipulated by a an unauthorized person. Also, if a child manages to operate such a prior art safety knob turning on hot water, he then cannot, in the condition of panic, reoperate the knob to close the flow of hot water. Even when an adult comes into the room, the adult, in conditions of panic, also may have difficulty in speedily operating the knob to close off the flow of scalding water in the shortest possible time.

Accordingly, an object of the present invention is to provide new and improved safety knobs.

Yet another object of the present invention is to provide knobs which anyone including unauthorized persons can operate in one direction and which provide for restricted operation in the opposite direction, whereby either an adult or a child can easily manipulate the knob to close the valve controlled by the knob, for example.

Yet another object of the present invention is to provide new and improved ratcheted safety knobs.

A related object of the present invention is to provide ratcheted safety knobs wherein the ratchet enables rotating the knob in one direction but will cause the knob to slip in the opposite direction; and therefore, the knob normally operates the valve controlled by the knob in only one direction of turning of the knob.

Another related object of the present invention is to provide ratcheted safety knobs which ordinarily operate in a first direction and slip in a second direction, but can be manipulated to operate in both directions.

In accordance with a preferred embodiment of the present invention a ratcheted safety knob is provided which comprises a splined inner knob surrounding a notched out outer knob having a ratchet mechanism located in the notch which normally meshes with the splines, when the outer knob is rotated in a first or clockwise direction. Thus, if the knob is mounted to a hot water faucet, normal rotation of the knob in the clockwise direction will assure that hot water valve is closed and the flow of hot water is immediately stopped.

In the opposite or counter-clockwise direction the ratchet normally slips over the splines of the inner knob so that turning the outer knob fails to turn the inner knob. To open the hot water faucet, in the preferred embodiment, requires the simultaneous rotation of the outer knob and the pressure application upon a push rod extending outwardly from the outer knob. The push rod abuts the splines of the inner knob, and thereby causes the inner knob and faucet to operate responsive to the rotation of the outer knob.

These and other objects and features of the present invention will be best understood by making reference to the accompanying drawings, wherein.

Figure 1:
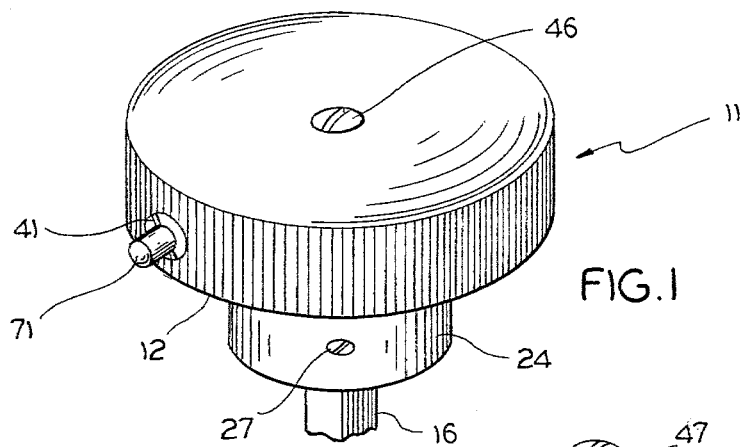
FIG. 1 is a pictorial showing of the preferred embodiment of the improved safety knob.

In FIG. 1 the improved safety knob assembly 11 is shown. Therein, as shown, the outer knob 12 has a threaded aperture 13 for receiving a safety push rod assembly 14. A stem 16 is shown extending from the bottom of the knob arrangement. The stem is attached to a valve, not shown, such as a water valve, for example.

The safety knob assembly 11 has means to enable it to turn the stem 16 when being rotated in the clockwise direction, shown by arrow A and to turn freely in the counter-clockwise direction, shown by the arrow B. If the push rod 17 of push rod assembly 14 is pushed in while the knob 12 is turning in the direction of the arrow A, then the stem 16 also is rotated in the counter-clockwise direction.

Figure 2:
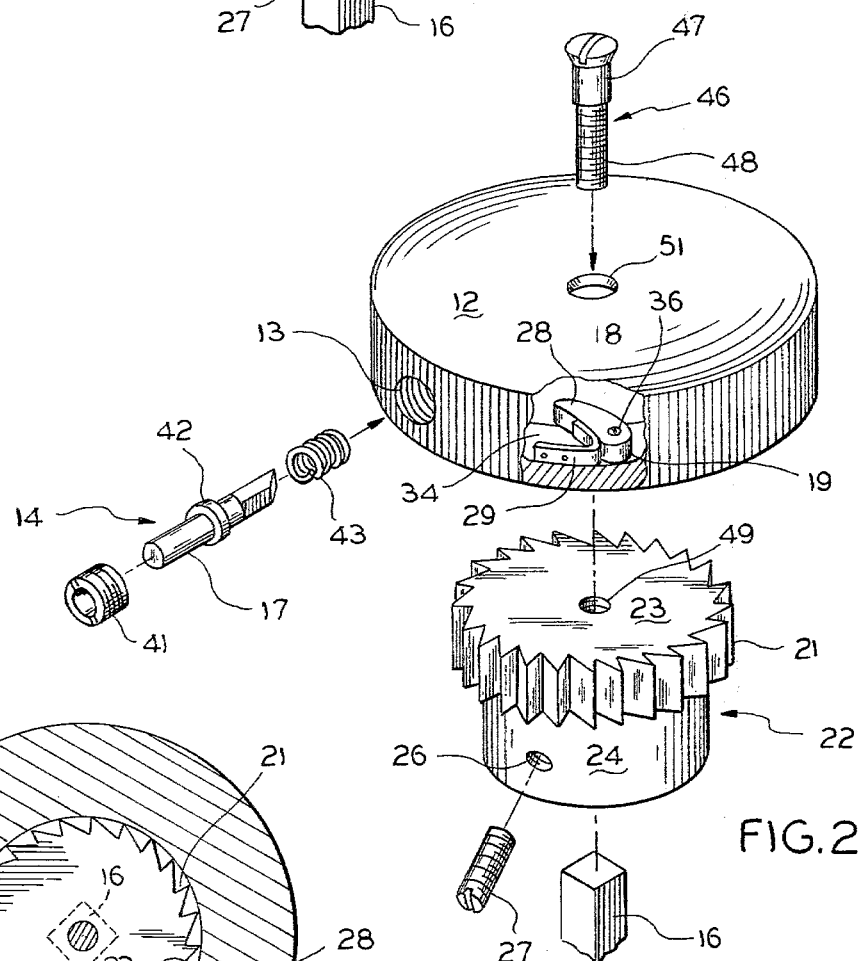
FIG. 2 is an exploded view of the safety knob of FIG. 1.
Figure 3:
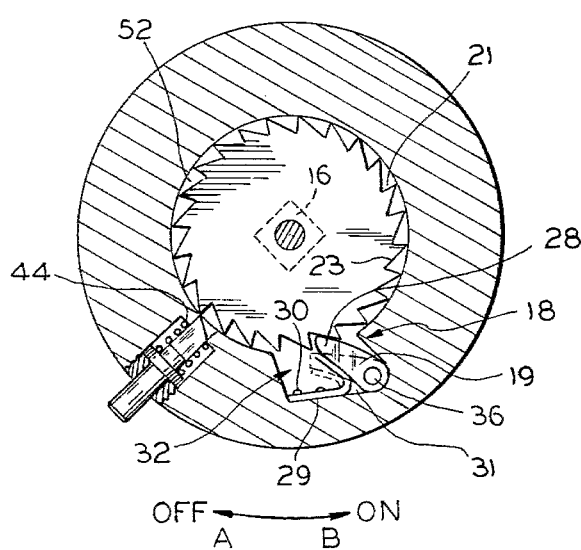
FIG. 3 is a sectional plan views of the safety knob showing how the various parts fit together and showing a push rod in the safety position.

The exploded view of FIG. 2 shows the component parts used in enabling the operation of the safety knob as above-described. Ratchet means 18 are provided for normally turning the knob without turning stem 16, when turning in counter-clockwise direction and for normally turning the stem 16, when turning the knob in the clockwise direction. More particularly, a spline lock member or pawl 19 is shown. The pawl is designed to either ride over or mesh with the splines 21 of the inner knob 22. The splines 21 of the inner knob extend, in a preferred embodiment, completely around the outer periphery of top 23 of the inner knob 22.

Downwardly extending from the inner knob 22 is a stem receiving portion 24. The stem receiving portion includes means, such as threaded hole 26 and threaded fastener 27 which, in a preferred embodiment, is a set screw removably attaching the inner knob to the stem of the valve.

The pawl 19 terminates in a characterized point 28. Abutting the side of the pawl 19 is a shaped spring member 29 attached to the side of the notch 32 of the outer knob 12. The pawl 19 is normally held meshing with splines 21 by spring member 29. The spring member 29 is attached to side 31 of notch 32 with fasteners, such as fastener 30, for example. The notch 32 is machined at one side of the bottom of the outer knob 12. A ledge 34 is mounted at the bottom of the notch in any well known manner.

A pivot pin 36 extends through an aperture in the pawl 19 and onto the ledge 34. The pawl 19 pivots around the pin. The point 28 is normally held against the splines 21 of the inner knob 22. However, because of the shape of the splines 21 and point 28, the pawl is forced against spring member 29, which has sufficient "give" to enable the pawl 19 to ride over the splines 21, when the outer knob is turned counter-clockwise (on).

When the outer knob 12 is turned in the clockwise direction, then the point 28 meshing with splines 21 locks the outer knob and inner knob together.

Means are provided for locking the inner knob to the outer knob, when the outer knob is rotated in the counter-clockwise direction. More particularly, push rod 14 assembly is provided which is normally position within aperture 13 of outer knob 12. The aperture extends through the outer knob and enables push rod 17 to abut against the splines 21.

Means, such as threaded member 41 in conjunction with shoulder 42 of rod 17 are used for retaining the push rod within aperture 13. When pressure is applied to push rod 17, it moves against a spring 43 held between shoulder 42 and ledge 44 at the bottom of aperture 13. The spring 43 normally prevents the push rod 17 from abutting and meshing with splines 21. When the push rod 17 is actuated to abut the splines 21, the rotation of the outer knob 12 rotates the inner knob also thereby rotating stem 16 and opening the valve.

It should be understood that other types of arrangements for always locking the knobs together in one direction of rotation, while the outer knob normally rotates freely in the opposite direction; can be used instead of ratchet assemblies. For example, the inner and outer knobs could have screw threads which mesh in one direction of rotation to lock the knobs together; but, not in the other direction.

Further, it should be understood that by not providing a pawl or attached push rod assembly, the knob can only be operated, when the operator uses a separate push rod.

An additional safety feature is inherently provided where the push rod assembly 14 is normally removed from the knob. To operate the knob to the open position, a push rod device is inserted in aperture 13. The aperture 13 can be locked using any well known locking device to prevent operating the knob to the open position with any kind of rod.

It should be noted that the pivot pin 36 preferably is a threaded type pin having a head thereon for retaining the pawl member in place.

The outer knob 12 is fastened to the inner knob 22 by means, such as fastener 46. The fastener 46 has a nonthreaded section 47 and a threaded section 48. The threaded section threads in aperture 49, while aperture 51 rotates freely about section 47.

In operation the knob normally on the stem is removed. The safety knob is assembled by turning the outer knob 12 upsidedown and attaching spring member 29 to wall 31. The ledge 34 with the pawl 19 thereon is attached at the bottom of notch 32. The inner knob 22 is then placed within the larger center aperture 52 of outer knob 12, and the outer knob 22 is fastened to the inner knob 22. The push rod assembly is placed in aperture 13 of the outer knob 12. The assembled knob is then fitted over the stem 16 and the set screw 27 is threaded into the aperture 26 to lock the knob onto the stem.

When the knob is turned in a clockwise direction without any manipulation of push rod 17, the pawl point 28 meshes with the splines 21 and the stem 16 is rotated. Therefore, if the outer knob is rotated clockwise, it closes the valve. However, when the outer knob is rotated, in a counter-clockwise direction, without manipulation of push rod 17, the point 28 of the pawl 19 slides or bounces over splines 21 of the inner knob, and the outer knob rotates without turning the inner knob and hence without turning the stem 16. Pushing on push rod 17 forces the rod against the splines 21 of the inner knob so that when the outer knob 12 is rotated, the inner knob rotates and stem 16 rotates to open the valve. Thus, an adult can open the valve, but a child cannot. Both an adult and a child can close the valve.

While the principles of the invention have been described above in connection with specific apparatus and applications, it is to be understood that this description is made by way of example, and not as a limitation on the scope of the invention.

I claim:

1. An improved safety knob for use in operating a stem,
   said safety knob comprising:
   outer knob means;
   first means for normally coupling said outer knob to said stem only when said outer knob is moved in a first direction to cause said stem to move with said outer knob;
   second means having normal and operated positions, said second means in said operated position coupling said outer knob to said stem regardless of the direction moved of said outer knob; and
   said outer knob means being operatively coupled to the stem only through said first means, when said second means is in the normal position.

2. An improved safety knob for use in operating a stem,
   inner knob means attached to the stem,
   outer knob means,
   first means for normally coupling said outer knob to said inner knob only when said outer knob is moved in a first direction to cause the inner knob to move with said outer knob and thereby move said stem in said first direction, and
   said second means for coupling said outer knob to said inner knob regardless of the direction of movement of said outer knob.

3. The improved safety knob of claim 2 and second means for coupling said outer knob to said inner knob regardless of the direction moved of said outer knob.

4. The improved safety knob of claim 3 wherein said first means comprises ratchet assembly means.

5. The improved safety knob of claim 4 wherein said ratchet assembly comprises splines on the outer periphery of said inner knob.

6. The improved safety knob of claim 3 wherein said second means comprises push button assembly means,
   said push button assembly means including push button extending through said outer knob means and normally removed from said inner knob means, and
   means responsive to applying pressure to said push button means, for causing said push button to abut said inner knob means so as to lock said inner knob means to said outer knob means to cause said inner knob means to move with said outer knob means.

7. The improved safety knob of claim 5 wherein said second means comprises push button assembly means,
   said push button assembly means including push button extending through said outer knob means and normally removed from said inner knob means, and
   means responsive to applying pressure to said push button means, for causing said push button to abut said inner knob means so as to lock said inner knob means to said outer knob means to cause said inner knob means to move with said outer knob means.

8. The improved safety knob of claim 7 wherein said push rod assembly includes spring means for normally preventing said push button from abutting the splines of said inner knob.

9. The improved safety knob of claim 8 wherein said push rod includes a characterized end shaped to mesh with the splines of said inner knob and to lock said outer knob to said inner knob.

10. An improved safety knob for use in rotating a stem, said safety knob comprising handle means, means for attaching said handle means to the stem, means for preventing unauthorized persons from turning the knob means in a first direction to cause said stem to rotate in said first direction, said last named means comprising control means associated with said knob means for causing said stem to rotate with said knob responsive to the operation of said control means, the improvement characterized in this that means are provided for turning said stem a second direction through the operation of said knob in said second direction means even with said control means in the non-operated condition.

11. The safety knob of claim 10 wherein means are provided for locking out said control means, whereby only a party with a key can operate said safety knob to turn said stem in said first direction.

12. The safety knob of claim 10 wherein said control means are normally separate from said safety knob.

* * * * *